United States Patent Office 3,298,859
Patented Jan. 17, 1967

3,298,859
EPOXIDE ADDITIVE FOR AMYLACEOUS FORMING SIZE COMPOSITIONS
Robert Wong and Philip W. Sullivan, Newark, Ohio, assignors to Owens-Corning Fiberglas Corporation, Toledo, Ohio, a corporation of Delaware
No Drawing. Filed Mar. 10, 1966, Ser. No. 533,258
7 Claims. (Cl. 117—126)

This is a continuation-in-part application of our parent application Serial Number 213,134, filed July 30, 1962, now abandoned.

The present invention relates to improved forming size compositions containing a water soluble epoxide additive.

In the production of weavable, continuous fibrous glass strands or yarns, a starch containing size composition is conventionally applied to the fibers immediately subsequent to provide a protective coating upon the fibers which shields them against the harmful effects of intrinsic mutual abrasion and provides a surface possessing lubricity and uniformity of tension characteristics, adequate to permit the strands to endure and efficiently function in a weaving process. The utilization of an amylaceous film former is based upon the ease with which such materials may be removed from the final fabric, by means of a heat-cleaning process. Their removal is necessitated by the fact that they possess inadequate durability and moisture and dirt resistance for the protection of the fabric and must be replaced by resinous coatings or fabric finishes which remedy these defects and impart wrinkle resistance, desirable tactile qualities and the ability to impart coloring or pigmentation to the fabrics. Conversely, such resinous finishing compositions are not suitable for utilization in a weaving process. As a consequence, two coatings with divergent properties, i.e. forming size composition and fabric finishing composition, are necessary for the preparation of fibrous glass fabrics.

As indicated, the utilization of starch based forming size compositions is in effect a compromise dictated by the processing conditions involved. For example, it would be preferable to utilize the fabric finishes as the sole coating, but this is precluded by the inadequate weaving characteristics of these compositions. Alternatively, it would be desirable to utilize a more durable material such as a synthetic resin, as a substitute for the starch film-former of the forming size composition. However, this too is impractical since such resins are not readily removable by heat cleaning or are susceptible to moisture attack, high or nonuniform tension characteristics, or incompatability with an aqueous system.

Despite an acceptance based upon weavability and ease of removal, the utilization of starch based compositions is attended by serious detriments in the form of weakened fibers and high tension values. While tensile strengths are not of principal importance in fibrous glass fabrics, weakened or inadequately protected fibers break to yield protruding fiber ends or "fuzz." In addition to yielding an undesirable appearance, such ends or fuzz cause processing impediments in that they tend to clog or block guide eyes and contact points of the weaving apparatus, and consequently cause work stoppages.

Accordingly, these is a definite need to upgrade the fiber strengths or fuzz resistance, and tension characteristics of starch sized fibrous glass yarns, without diminishing the ease with which such size compositions may be removed subsequent to weaving and prior to the application of fabric finishing compositions.

It is an object of the present invention, to provide starch based forming size compositions capable of imparting increased protection and lower tension characteristics to glass fibers.

A further object is the provision of starch sized glass fibers possessing improved strengths, fuzz resistance and tension characteristics.

The foregoing objects are achieved by means of the addition of a quantity of water soluble epoxide to forming size compositions for glass fibers, which contain an amylaceous film former.

Specifically, it has been found that the fiber strengths of starch sized glass fibers may be increased, the occurrence of fuzz or broken ends in such products may be greatly reduced, and their tension characteristics significantly lowered, by means of an epoxide additive.

The starch compositions which are subject to the improvement of the present invention are those which comprise an aqueous dispersion of an amylaceous composition. The starch component e.g. corn, potato, waxy maize starches, etc., the degradation products or derivatives of such starches, e.g. dextrines, guar gums, enzyme derivatives, etc., fractions of such starches, e.g. amylose, amylopectin, or the starches of hybrid plants which possess unusual amylose:amylopectin ratios.

Such compositions comprise between 1–12% by weight of the amylaceous compound in an aqueous medium, and may optionally contain such additives as e.g. polyoxyethylene sorbitan monooleate, iso-octyl phenyl polyethoxy ethanol, etc., waxes such as vegetable oil, animal oil, amine-fatty acid condensates, etc., and the like.

In accordance with the invention, water soluble epoxides are added to such aqueous dispersions of amylaceous materials, in a quantity equal to 0.5% to 25% by weight of the amylaceous component. Thus, for example, if the size composition to be improved contains 10% by weight of the starch component, between 0.05 to 2.5% by weight of the water soluble epoxide should be added to the size composition. Furthermore, since starch based size compositions conventionally contain between 1–12% by weight of the amylaceous component, the quantity of epoxide to be employed should range between .005 to 3% by weight of the size composition.

The epoxide composition may comprise any water soluble epoxide film former. The term "epoxide film former" is employed to connote those compositions which possess the oxirane ring or group, characteristic of such compounds and comprised of the structure:

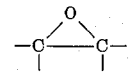

Thus it may be generally stated that any epoxide film-former possessing the above oxirane ring is suitable. However, the scope of such compounds is further restricted in that they must be water soluble.

While water soluble epoxides derived by reacting an epoxide composition and a primary or secondary alkanol-monoamine and forming a salt of the reaction product, are preferred, any water soluble epoxide is suitable.

A preferred additive comprises the composition of the following example:

*Example 1*

Equimolar quantities of diethanolamine and an epoxide having the formula:

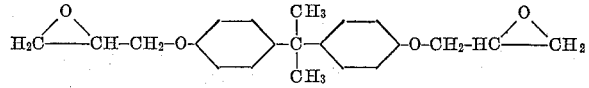

were admixed and dispersed in a diacetone alcohol reaction medium which was then heated at 100° C. for a period of one hour.

Acetic acid was then added to the reaction product until a pH of 6.5±0.5 was obtained. Since the reaction product is soluble in diacetone alcohol it may be employed in the form of the solution. Alternatively, it may be separated by extraction or distillation. If separation is desirable, the reaction product may be prepared in a reaction medium in which it is insoluble, e.g. toluene. Water may then be added to form an aqueous solution of the reaction product which may be removed upon phase separation. When the composition is to be employed in an aqueous size composition as previously discussed, the admixture of reaction product and reaction medium, e.g. diacetone alcohol, may be added to the size formulation and acidified by the addition of acid to the latter formulation.

The reaction product derived from the above reaction comprised a pale yellow liquid which yielded clear, abrasion and moisture resistant films when cast upon a glass plate. The product is relatively stable and was soluble in warm water after storage in excess of 30 days at room temperature.

It should be noted that equimolar quantities of the amine and epoxide were employed in order to insure that the reaction product was possessed of one oxirane ring, with the other oxirane ring split by the active amine hydrogen, as shown below:

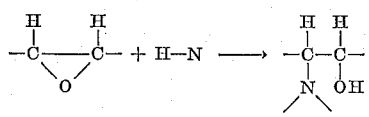

Such proportions are employed in order to preserve the epoxide character while achieving the water solubility which stems from the presence of the solubilizing amino group.

Similarly, water soluble epoxides may be prepared from various monomeric and higher epoxides which contain at least two oxirane groups. Various types of epoxides which have been solubilized by the prescribed techniques include the following (see our co-pending application Serial No. 213,133, filed July 30, 1962, and now abandoned):

(A) Glycidyl ethers of phenols (e.g. bis phenol A-epichlorohydrin reaction products):

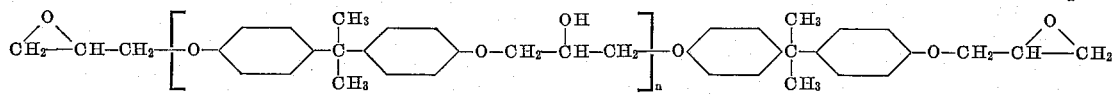

(B) Glycidyl ethers of condensation products of polyhydric phenols and aldehydes (novolac epoxides):

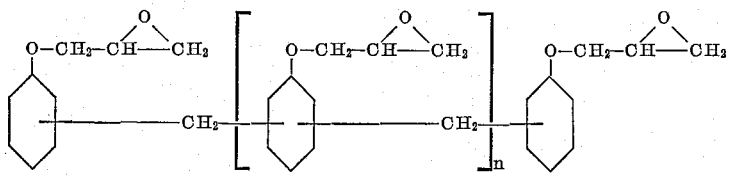

The amines which are reacted with the epoxides comprise primary or secondary amines having at least one valence of nitrogen satisfied by hydrogen and at least one valence of nitrogen satisfied by an aliphatic hydroxy group. While dialkanolamines such as diethanolamine, di(iso)propanolamine, etc., are the preferred amine reactants, other aliphatic hydroxy substituted amines such as the alkanolamines, e.g. ethanolamine, methyl amino ethanol, etc., amine ethers such as 2-hydroxy ethyl ether, polyoxyethylene amine, and the like, and hydroxy and polyhydroxy amines such as 1,2,3,4,5,6-hexahydroxy amine, tris (hydroxymethyl) aminomethane, 2-amino-2-methyl 1,3-propanediol, and the like, are also suitable.

Broadly the amine reactant may be described as a primary or secondary amine having at least one valence of the nitrogen satisfied by an aliphatic radical containing at least one hydroxy group. The hydroxy group must be connected to the nitrogen atom through a chain of atoms that does not contain alkyl groups of larger than six carbon atoms of oxygen or nitrogen, and provided the lower alkyl groups do not exceed approximately 25 in number. Such compounds may be generally depicted by the following formula:

$$\begin{matrix} & R_1 \\ & | \\ H-&N-R_2 \end{matrix}$$

wherein $R_1$ is a member of the class consisting of, an alkyl radical of a chain length of from 1 to 7 carbon atoms, an amine, or an $R_2$ radical; and $R_2$ is a member of the group consisting of: (1) an aliphatic hydrocarbon having a chain length of from 1 to 7 carbon atoms and including at least one hydroxy group, (2) —OH, and (3) —$(XR_3)_n$OH wherein X is an atom of the group of oxygen and nitrogen, $R_3$ is a lower alkyl having a carbon to carbon chain length of from 1 to 6 carbon atoms, and $n$ is an integer of from 1 to 25. Preferably $R_1$ or $R_2$ should be a lower alkanol of less than 7 carbon atoms; and most preferably $R_2$ should be a lower alkanol of less than 5 carbon atoms and, $R_1$ a lower alkyl radical. Ideally both $R_1$ and $R_2$ should be lower alkanol radicals of less than 5 carbon atoms.

Essentially, the reactant need only be a primary or secondary amine having at least one hydrogen atom and at least one aliphatic hydroxy group. The amine group in the final reaction product may be termed a solubilizing group while the active hydrogen atom of the amine reactant is the means of achieving reaction with epoxide reactant. The aliphatic substituent possesses only one terminal hydroxy group, it is preferable that the overall chain length of this substituent be restricted to no more than 6 carbon atoms. However, when the aliphatic chain is interspersed with oxygen atoms, e.g. ethers (—R—C—R—O—R—) as many as 25 divalent hydrocarbon radicals, each containing no more than 6 carbon atoms, are suitable.

The salt formation may be achieved with either an organic or inorganic acid. While acetic acid is preferred, satisfactory water soluble salts were prepared with lactic, phosphoric, sulfuric and hydrochloric acid.

A variety of size compositions were prepared by adding different quantities of the water soluble epoxides of Example 1 to starch containing size compositions, as shown by the following examples:

*Example 2*

A forming size composition was prepared from an aqueous solution containing 9.15% by weight of dextrinized starch. To 100 parts of this solution 2.12 parts by weight of vegetable oil lubricant was admixed to form the size composition.

*Example 3*

To the size composition of Example 2, was added 0.04% by weight of the water soluble epoxide of Example 1.

*Example 4*

The method of Example 3 was repeated with the quantity of epoxide increased to 0.08% by weight.

*Example 5*

The method of Example 3 was repeated with the quantity of epoxide increased to 0.175% by weight.

Example 6

The method of Example 3 was repeated with the quantity of epoxide increased to 0.4% by weight.

Example 7

The method of Example 3 was repeated with the quantity of epoxide increased to 0.875% by weight.

Example 8

The method of Example 3 was repeated with the quantity of epoxide increased to 1.75% by weight.

The size compositions of Examples 2–8 were applied at forming to D450–1/0 fibrous glass strands which were subsequently twisted and quilled. The size compositions were applied by means of an apron applicator such as that disclosed by U.S. 2,873,718 and subsequent analysis demonstrated that all of the strands possessed between 2.14–2.63% by weight of size solids upon drying.

In order to determine the effect of the inventive additives upon the sized fibers, samples of fibers treated with each of the compositions were subjected to breaking tests. As a further indication of fiber strengths, and of the degree of protection afforded by the size compositions, visual determinations were made of the fuzz occurrence or number of broken ends, after both the twisting and quilling operations. In addition the tension characteristics of the strands sized with each of the compositions were determined. The results of these tests are embodied in the following table:

| Size Composition | Quantity of Epoxide (Percent by Weight) | Fiber Breaking Strength (Pounds) | Fuzz Index After Twisting (1=less than 10 broken filaments 2-11-25 broken filaments) | Fuzz Count After Quilling | Quill Tension (Grams) |
|---|---|---|---|---|---|
| Example 2 | 0 | 1.3 | 2 | 29 | 36 |
| Example 3 | .04 | 1.3 | 2 | 29 | 34 |
| Example 4 | .08 | 1.3 | 1 | 20 | 32 |
| Example 5 | .175 | 1.4 | 1 | 18 | 35 |
| Example 6 | .4 | 1.6 | 1 | 10 | 30 |
| Example 7 | .875 | 1.6 | 1 | 22 | 33 |
| Example 8 | 1.75 | 1.5 | 1 | 33 | 34 |

The above data clearly demonstrates that fiber strengths are increased, fuzz occurrence is reduced and tensions are diminished when the inventive additives are employed in a conventional starch based size composition, and that optimal conditions are achieved when the additive is utilized in a quantity equivalent to approximately 5% by weight of the starch component. It is noted that with the size composition of Example 6, fiber strengths are increased 23%, fuzz occurrence after twisting is reduced 50%, fuzz occurrence after quilling is reduced 65%, and tensions are reduced 17%.

Thus it is apparent that significant improvements in the increase of fiber strengths, the reduction of fiber breaks or abrasion and the reduction of tension characteristics, are achieved by means of the present invention, without detracting from the desirable characteristics contributed by starch based size compositions and without the necessity for increasing the quantities of size materials which are applied to the glass fibers.

It is apparent that improved forming size compositions and sized glass fibers possessing improved properties, are made possible by virtue of the present invention.

It is also obvious that various changes, alterations and substitutions may be made in the compositions, methods and products of the present invention, without departing from the spirit of the invention, as defined by the following claims.

We claim:
1. A method for sizing glass fibers comprising applying to the surfaces of said fibers during their formation by attenuation an aqueous dispersion consisting essentially of:
   (a) between 1 to 12% by weight of a starch, and
   (b) between 0.005 to 3.0% by weight of a water soluble epoxide compound consisting of the acidified reaction product of:
     (1) an epoxide compound having at least two oxirane groups, and
     (2) a monoamine having the formula

wherein $R_1$ is a member of the class consisting of an alkyl radical of a chain length of from 1 to 7 carbon atoms, an amine, or an $R_2$ radical; and $R_2$ is a member of the group consisting of:
     (1) an aliphatic hydrocarbon having a chain length of from 1 to 7 carbon atoms and including at least one hydroxy group, (2) —OH, and (3) —$(XR_3)_nOH$ wherein X is an atom of the group of oxygen and nitrogen, $R_3$ is a lower alkyl having a carbon to carbon chain length of from 1 to 6 carbon atoms, and $n$ is an integer of from 1 to 25,
   (3) the ratio of said monoamine to said oxirane groups being less than 1:1, the balance of said aqueous dispersion being essentially water.

2. A method as claimed in claim 1 in which said epoxide composition is the glycidyl ether of a polyhydric phenol.

3. A method as claimed in claim 1 in which said epoxide compound is the glycidyl ether of the condensate of a phenol and aldehyde.

4. A method as claimed in claim 1 in which said monoamine is a dialkanolamine having alkanol radicals containing no more than 6 carbon atoms.

5. Glass fibers coated with a composition consisting essentially of the dried residue of an aqueous dispersion of:
   (a) between 1 to 12% by weight of a starch, and
   (b) between 0.005 to 3.0% by weight of a water soluble epoxide compound consisting of the acidified reaction product of:
     (1) an epoxide compound having at least two oxirane groups, and
     (2) a monoamine having the formula

wherein $R_1$ is a member of the class consisting of an alkyl radical of a chain length of from 1 to 7 carbon atoms, an amine, or an $R_2$ radical; and $R_2$ is a member of the group consisting of:
     (1) an aliphatic hydrocarbon having a chain length of from 1 to 7 carbon atoms and including at least one hydroxy group, (2) —OH, and (3) —$(XR_3)_nOH$ wherein X is an atom of the group of oxygen and nitrogen, $R_3$ is a lower alkyl having a carbon to carbon chain length of from 1 to 6 carbon atoms, and $n$ is an integer of from 1 to 25, (3) the ratio of said monoamine to said oxirane groups being less than 1:1, the balance of said aqueous dispersion being essentially water.

6. Glass fibers as claimed in claim 5 in which said epoxide composition is selected from the group consisting of the glycidyl ether of a polyhydric phenol and the glycidyl ether of the condensate of a phenol and an aldehyde.

7. Glass fiber as claimed in claim 5 in which said monoamine is a dialkanolamine having alkanol radicals containing no more than 6 carbon atoms.

No references cited.

ALFRED L. LEAVITT, *Primary Examiner.*

W. L. SOFFIAN, *Assistant Examiner.*